(12) United States Patent
Chen et al.

(10) Patent No.: US 9,651,359 B2
(45) Date of Patent: May 16, 2017

(54) DUAL WAVELENGTH DUAL INTERFEROMETER WITH COMBINER-SPLITTER

(71) Applicant: KLA-Tencor Corporation, Milpitas, CA (US)

(72) Inventors: Dengpeng Chen, Singapore (SG); Yi Zhang, Sunnyvale, CA (US); Jie-Fei Zheng, Fremont, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 14/945,847

(22) Filed: Nov. 19, 2015

(65) Prior Publication Data

US 2016/0146590 A1    May 26, 2016

Related U.S. Application Data

(60) Provisional application No. 62/083,113, filed on Nov. 21, 2014.

(51) Int. Cl.
*G01B 9/02*    (2006.01)

(52) U.S. Cl.
CPC ..... *G01B 9/02027* (2013.01); *G01B 9/02007* (2013.01)

(58) Field of Classification Search
CPC ........................ G01B 9/02027; G01B 9/02007
USPC ......................................... 356/477, 484, 512
See application file for complete search history.

(56) References Cited

U.S. PATENT DOCUMENTS

| 6,480,286 | B1 | 11/2002 | Kubo et al. |
| 6,847,458 | B2 | 1/2005 | Freischlad et al. |
| 7,268,887 | B2* | 9/2007 | Kulawiec ............... G01B 11/06 356/485 |
| 7,847,954 | B2 | 12/2010 | Tang et al. |

(Continued)

FOREIGN PATENT DOCUMENTS

| CN | 100470191 C | 3/2009 |
| CN | 102252823 B | 8/2013 |

OTHER PUBLICATIONS

James G. Wyant Extended Range Two-Wavelength Interferometry Optical Sciences Center, 2012 http://fp.optics.arizona.edu/jcwyant/Optics513/ChapterNotes/Chapter05/Notes/ExtendedRangeTwo-WavelengthInterferometry.pdf.

(Continued)

*Primary Examiner* — Jonathan Hansen
(74) *Attorney, Agent, or Firm* — Suiter Swantz pc llo

(57) ABSTRACT

The system includes a dual interferometer sub-system including a first and second channel. The system includes an illumination source. The illumination source includes a first laser source disposed along a first input path and a second laser source disposed along a second input path. The illumination sources includes a combiner-splitter element optically coupled to an output of the first laser source and an output of the second laser source and is configured to combine light of a first wavelength from the first laser source and light of a second wavelength from the second laser source. The combiner-splitter element is further configured to split the combined light into a first channel and a second channel of the dual interferometer sub-system, where the first and second each receive a portion of the light of the first wavelength and the light of the second wavelength.

35 Claims, 7 Drawing Sheets

(56) References Cited

U.S. PATENT DOCUMENTS

| | | | |
|---|---|---|---|
| 8,068,234 | B2 | 11/2011 | Tang et al. |
| 2006/0262324 | A1 | 11/2006 | Hays et al. |
| 2007/0201795 | A1 | 8/2007 | Rice et al. |
| 2009/0040519 | A1 | 2/2009 | Zhang |
| 2010/0094135 | A1 | 4/2010 | Fang-Yen et al. |
| 2011/0032603 | A1 | 2/2011 | Rothenberg |
| 2013/0182262 | A1* | 7/2013 | Tang .................. G01B 9/02027 356/503 |
| 2014/0293291 | A1 | 10/2014 | Tang |

OTHER PUBLICATIONS

P. Hariharan Handbook of Optics: Devices, Measurements, and Properties, vol. II, Second Edition, Part 2: Optical Instruments, Chapter 21: Interferometers Division of Applied Physics http://photonics.intec.ugent.be/education/IVPV/res_handbook/v2ch21.pdf.

PCT International Search Report for Application No. PCT/US2015/061938, Mail Date Feb. 5, 2016, 3 pages.

Graham Optical Systems, Infrared Interferometers by Graham Optical Systems, Dual Wavelength IR/Visible Fizeau Interferometers, © 2014 Graham Optical Systems, Jul. 28, 2014, Found online at <http://www.grahamoptical.com/ dualwaveinter.html>.

H.J. Tiziani et al., Dual-wavelength heterodyne differential interferometer for high-precision measurements of reflective aspherical surfaces and step heights, Applied Optics, Jul. 1, 1996, pp. 3525-3533, vol. 35, No. 19, Optical Society of America.

Sangwon Hyun et al., Frequency-comb-referenced multi-wavelength profilometry for largely stepped surfaces, Optics Express, Apr. 12, 2013, pp. 9780-9791, vol. 21, No. 8, Optical Society of America.

Julian D.C. Jones, Interferometry and Polarimetry for Optical Sensing (Chapter 12), Handbook of Optical Fibre Sensing Technology, Apr. 2002, pp. 227-245, John Wiley & Sons Ltd.

Klaus Freischlad et al., Interferometry for wafer dimensional metrology, Advanced Characterization Techniques for Optics, Semiconductors, and Nanotechnologies III, Proc. of SPIE, vol. 6672, pp. 667202-1-667202-14, Sep. 10, 2007.

Yunjiang Rao, Study on Fiber-Optic Low-Coherence Interferometric and Fiber Bragg Grating Sensors, Photonic Sensors, Aug. 6, 2011, pp. 382-400, vol. 1, No. 4, Springerlink.com.

Dahi Ghareab Abdelsalam, Surface Micro Topography Measurement Using Interferometry, Recent Interferometry Applications in Topography and Astronomy, Mar. 2012, pp. 27-57, InTech, Available from: http://www.intechopen.com/books/recent-interferometry-applications-in-topographyand-astronomy/surface-micro-topography-measurement-with-interfometry.

* cited by examiner

DUAL WAVELENGTH DUAL INTERFEROMETER WITH COMBINER-SPLITTER

CROSS-REFERENCE TO RELATED APPLICATION

The present application claims the benefit under 35 U.S.C. §119(e) of U.S. Provisional Application Ser. No. 62/083,113, filed Nov. 21, 2014, entitled DUAL WAVELENGTH DUAL FIZEAU INTERFEROMETER (DWDFI) WITH FIBER BUNDLE COMBINER/SPLITTER (FBCS), naming Dengpeng Chen, Yi Zhang and Jeff Zhang as inventors, which is incorporated herein by reference in the entirety.

TECHNICAL FIELD

The present disclosure relates to the field of interferometry, and, in particular, to a dual wavelength dual interferometer with an optical combiner-splitter.

BACKGROUND

Interferometry is a useful technique for measuring one or more spatial characteristics of a sample, such as a semiconductor wafer or any other semiconductor or non-semiconductor substrate, based on information associated with illumination reflected from test surfaces of the sample. As semiconductor fabrication continually requires higher levels of accuracy and precision, improved interferometry techniques are needed to meet the demands of modern fabrication technologies. Phase-shifting interferometry offers many advantages over other interferometry techniques including, but not limited to, higher measurement accuracy, insensitivity to contrast, illumination uniformity, and obtainable phase at fixed grid points. It would be desirable to provide an improved method and system for performing interferometry on a sample.

SUMMARY

A system for providing combined light from two or more lasers to two or more channels of an optical sub-system is disclosed, in accordance with one or more embodiments of the present disclosure. In one embodiment, the system includes an optical sub-system including a first channel and at least a second channel. In another embodiment, the system includes an illumination source. In another embodiment, the illumination source includes a first laser source disposed along a first input path and configured to generate light of a first wavelength. In another embodiment, the illumination source includes at least a second laser source disposed along at least a second input path and configured to generate light of at least a second wavelength. In another embodiment, the illumination source includes a combiner-splitter element, the combiner-splitter element optically coupled to an output of the first laser source and an output of the at least a second laser source. In another embodiment, the combiner-splitter element is configured to combine the light of the first wavelength and the light of the at least a second wavelength. In another embodiment, the combiner-splitter element is further configured to split the combined light along a first output path to the first channel of the optical sub-system and at least a second output path to at least the second channel of the optical sub-system.

A system for providing combined light from two or more lasers to two or more channels of a dual wavelength dual interferometer sub-system is disclosed, in accordance with one or more embodiments of the present disclosure. In one embodiment, the system includes a dual interferometer sub-system including a first channel and at least a second channel. In another embodiment, the system includes an illumination source. In another embodiment, the illumination source includes a first laser source disposed along a first input path and configured to generate light of a first wavelength. In another embodiment, the illumination source includes at least a second laser source disposed along at least a second input path and configured to generate light of at least a second wavelength. In another embodiment, the illumination source includes a combiner-splitter element, the combiner-splitter element optically coupled to an output of the first laser source and an output of the at least a second laser source. In another embodiment, combiner-splitter element is configured to combine the light of the first wavelength and the light of the at least a second wavelength. In another embodiment, the combiner-splitter element is further configured to transmit a first portion of the light of the first wavelength from the first input path and a first portion of the light of the at least a second wavelength from the at least a second input path to the first channel of the dual interferometer sub-system. In another embodiment, the combiner-splitter element is further configured to transmit at least a second portion of the light of the first wavelength from the first input path and at least a second portion of the light of the at least a second wavelength from the at least a second input path to the at least a second channel of the dual interferometer sub-system.

A method for providing combined light from two or more lasers to two or more channels of an optical sub-system is disclosed, in accordance with one or more embodiments of the present disclosure. In one embodiment, the method includes generating light of a first wavelength along a first input path. In another embodiment, the method includes generating light of at least a second wavelength along at least a second input path. In another embodiment, the method includes combining the light of the first wavelength from the first input path and the light of the at least a second wavelength from the at least a second input path. In another embodiment, the method includes splitting the combined light into a first channel of an optical system and at least a second channel of the optical system, wherein the first channel and the at least a second channel receive a portion of the light of the first wavelength from the first input path and a portion of the light of the at least a second wavelength from the at least a second input path.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Reference will now be made in detail to the subject matter disclosed, which is illustrated in the accompanying drawings.

Figure 1A:
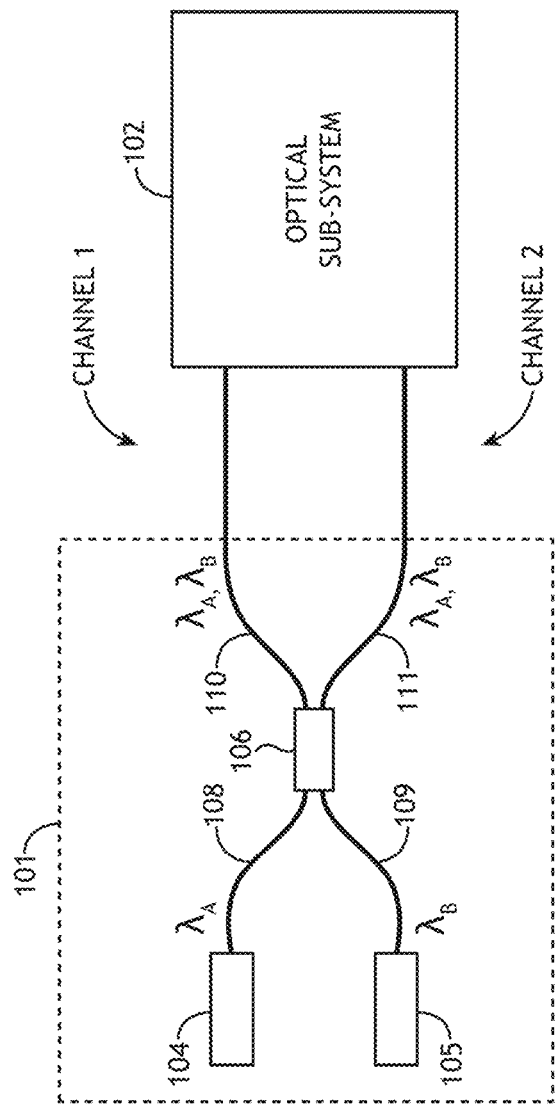
FIG. 1A is a block diagram illustrating a system for providing light combined from two or more lasers of an illumination source to two or more channels of an optical sub-system, in accordance with one or more embodiments of the present disclosure.
Figure 1B:
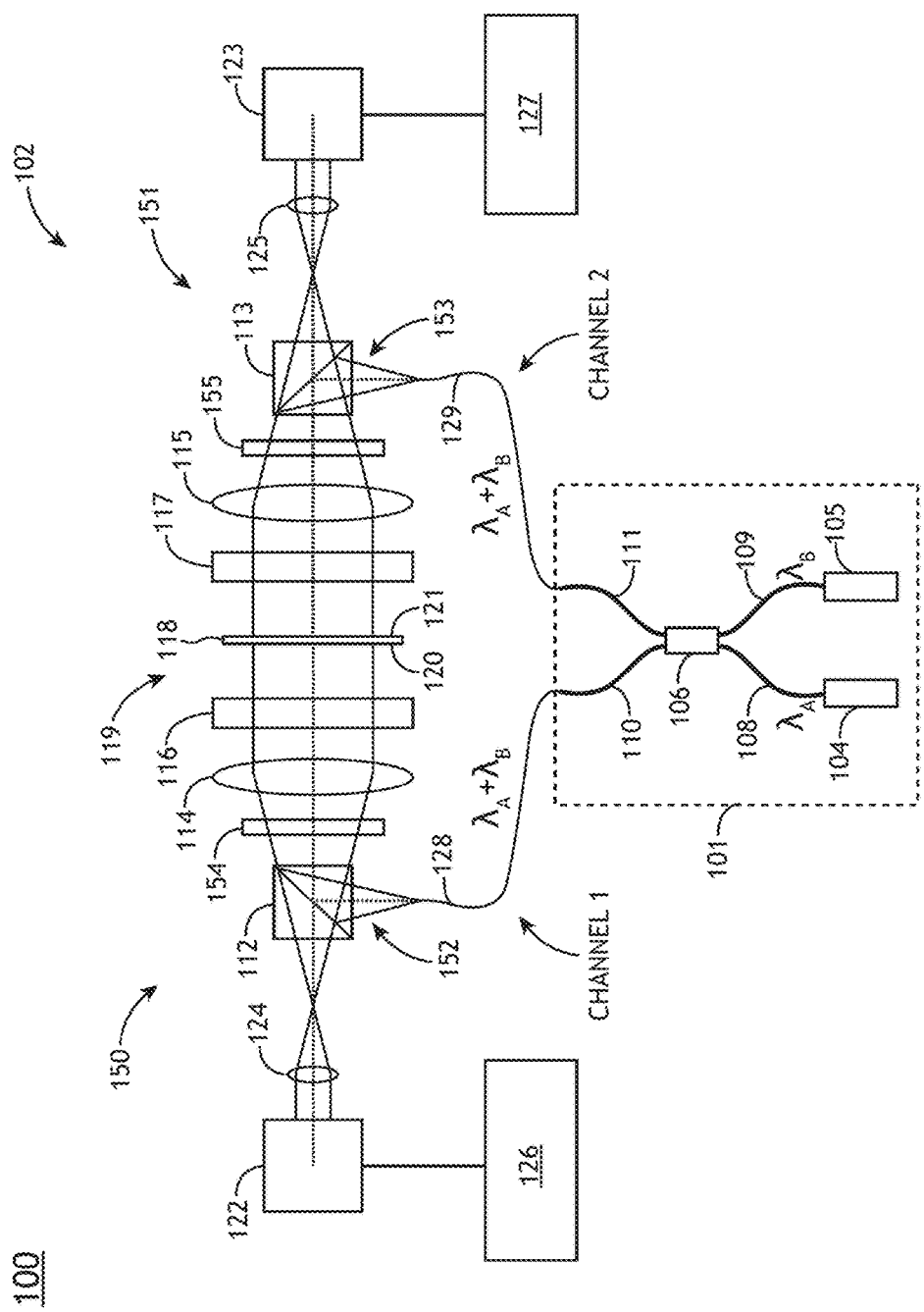
FIG. 1B is a block diagram illustrating a system for providing light combined from two or more lasers of an illumination source to two or more channels of a dual wavelength duel interferometer system, in accordance with one or more embodiments of the present disclosure.
Figure 1C:
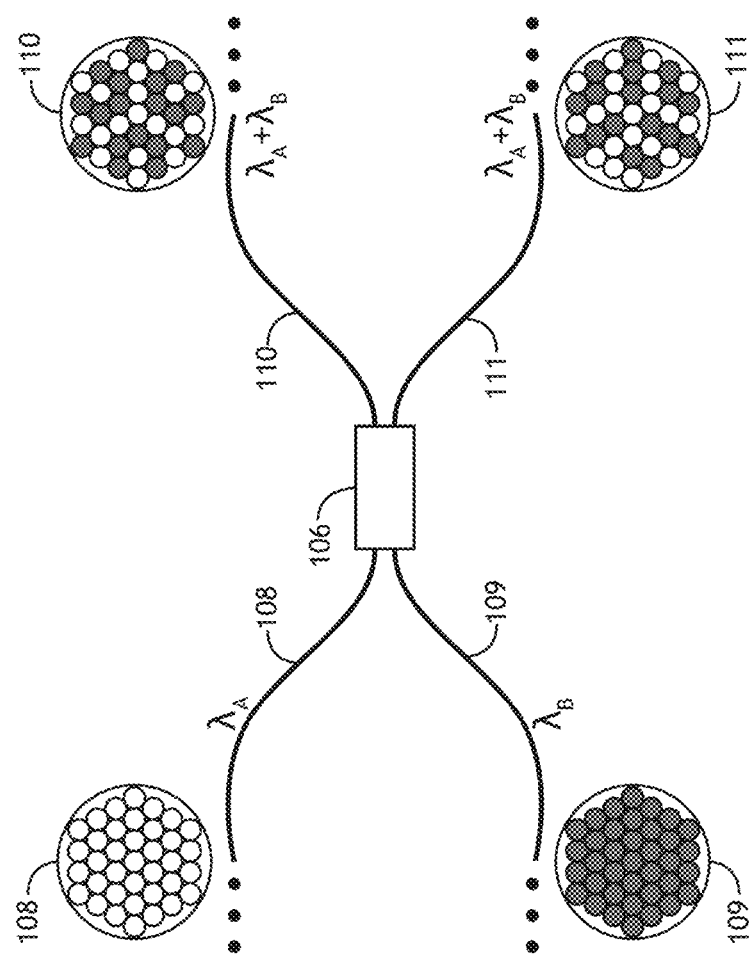
FIG. 1C is a simplified schematic view illustrating a combiner-splitter element of an illumination source for combining light from two or more lasers, in accordance with one or more embodiments of the present disclosure.
Figure 1D:
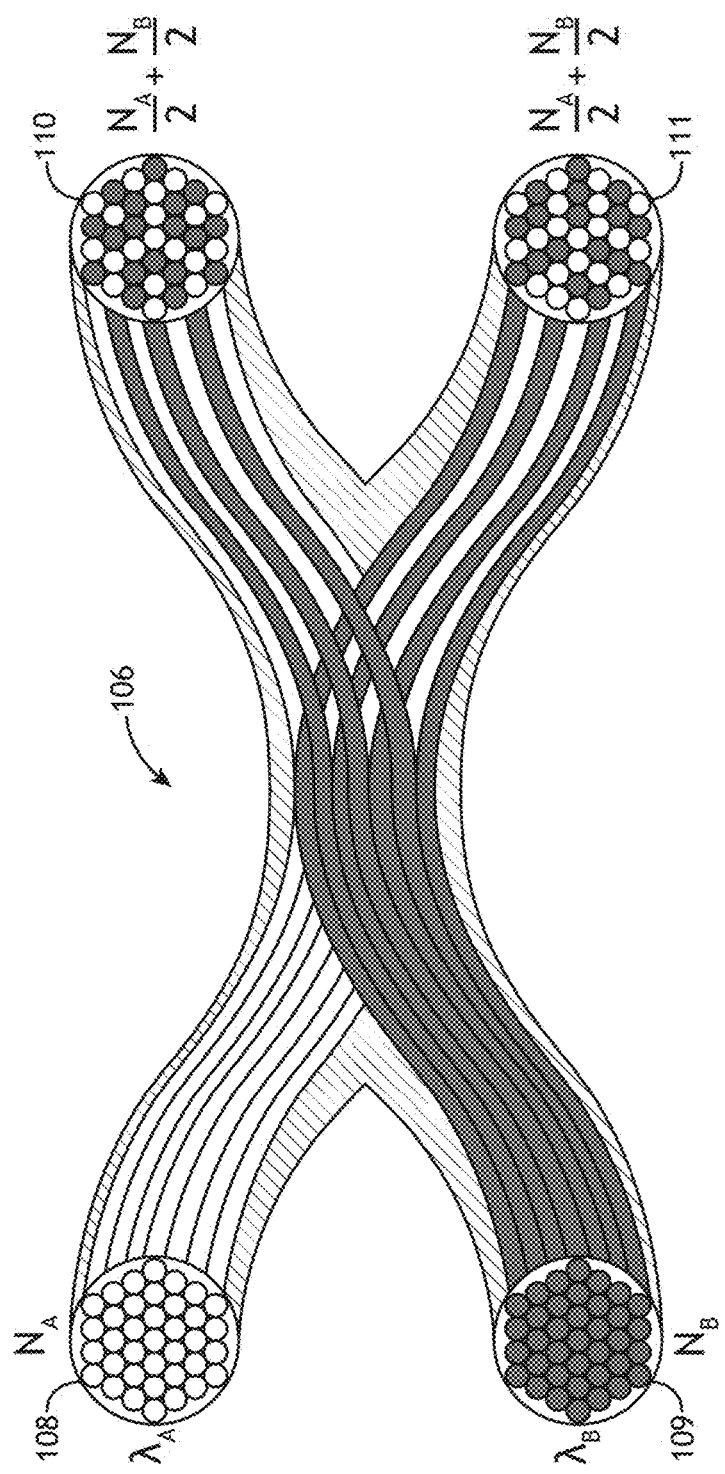
FIG. 1D is a simplified schematic view illustrating a combiner-splitter element and the individual optical fibers of a set of optical fiber bundles for combining light from two or more lasers, in accordance with one or more embodiments of the present disclosure.
Figure 1E:
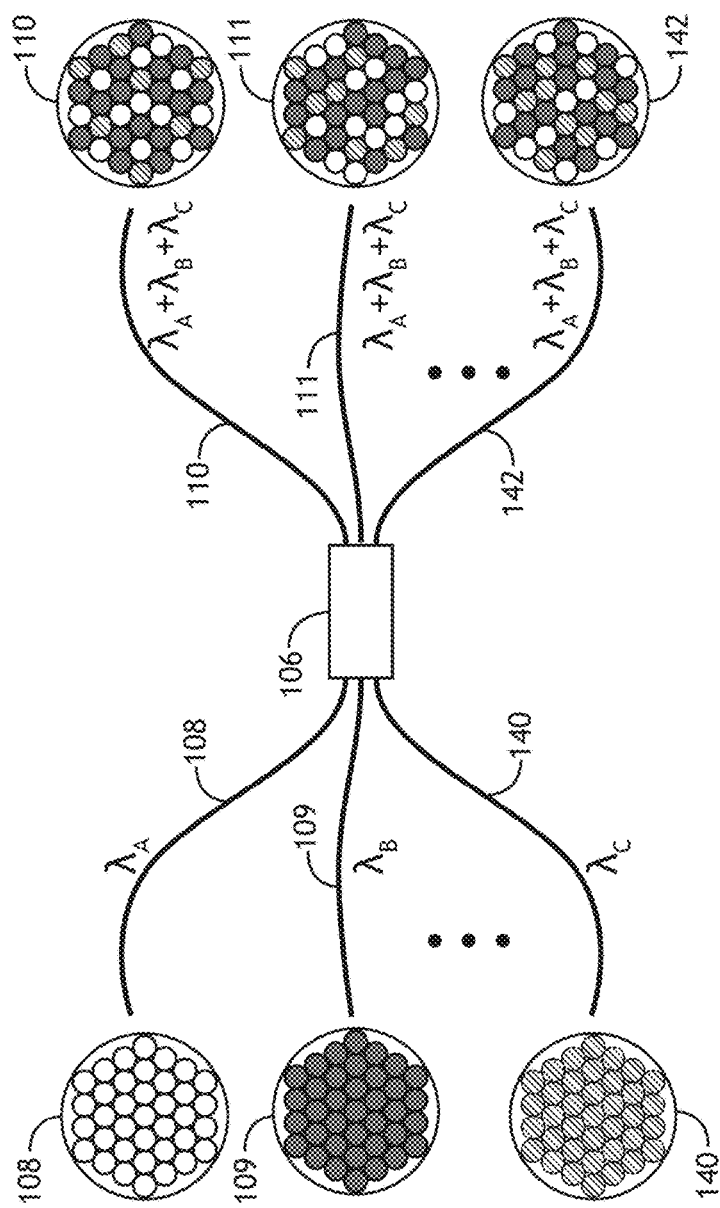
FIG. 1E is a simplified schematic view illustrating a combiner-splitter element of an illumination source for combining light from three or more lasers, in accordance with one or more embodiments of the present disclosure.
Figure 1F:
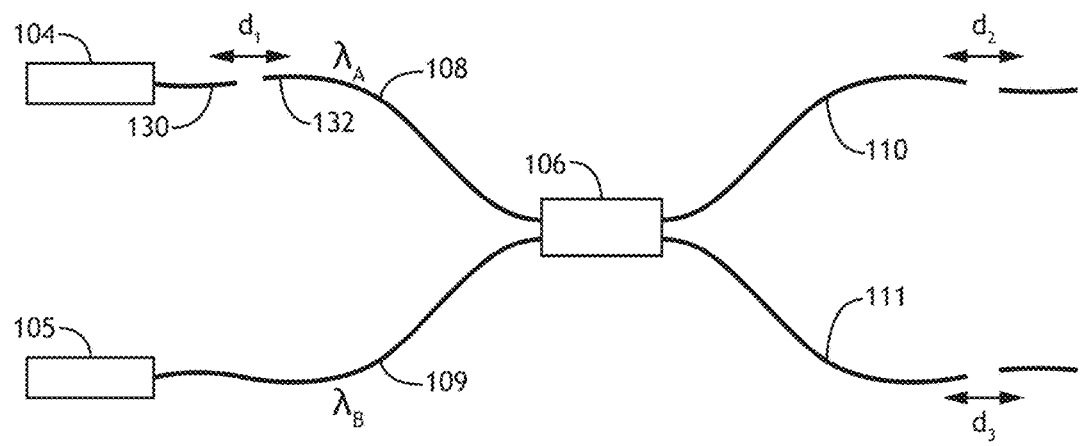
FIGS. 1F-1G are block diagrams illustrating the adjustment of intensity along a selected optical path by controlling the distance between two optical fiber ends, in accordance with one or more embodiments of the present disclosure.
Figure 1G:
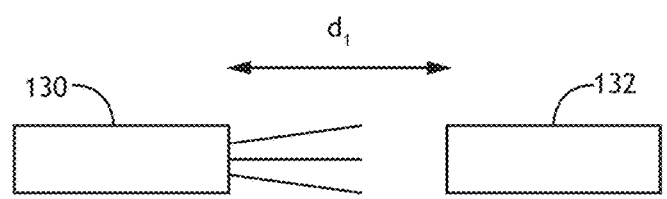
Figure 2:
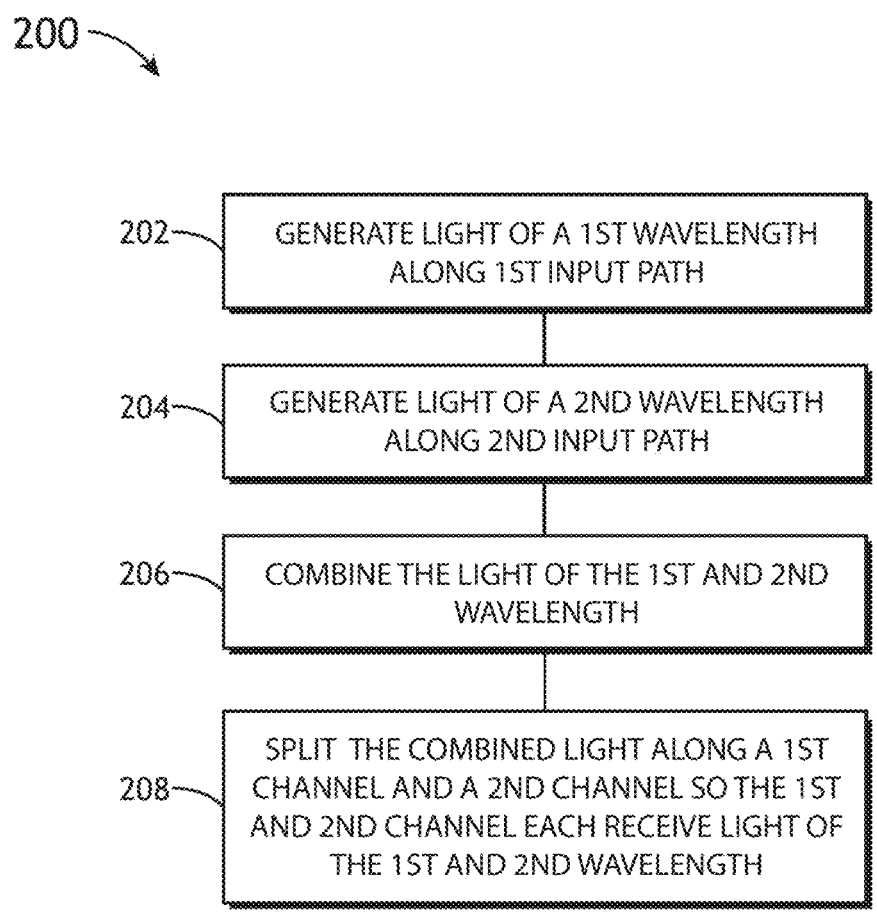
FIG. 2 is a flow diagram illustrating a process for providing light combined from two or more lasers of an illumination source to two or more channels of an optical sub-system, in accordance with one embodiment of the present invention.

FIGS. 1A through 2 illustrate a system and method for providing light combined from two or more lasers of an illumination source to two or more channels of an optical sub-system. Embodiments of the present disclosure are directed to the combination or mixing of light from multiple light sources and then the subsequent splitting of the combined light across multiple channels of an optical system or sub-system, such as, but not limited to, a dual wavelength dual Fizeau interferometer (DWDFI) system, an inspection system or an optical metrology system. Some embodiments of the present disclosure are directed to the measurement of wafer shape and wafer thickness variation using a DWDFI system. Embodiments of the present disclosure serve to extend the dynamic range of the interferometry system of the present disclosure, which provides for improved accuracy in cases of measuring a high slope wafer, a wafer with a deposited film and/or a patterned wafer.

FIG. 1A illustrates a system 100 for providing light combined from two or more lasers of an illumination source to two or more channels of an optical sub-system, in accordance with one or more embodiments of the present disclosure.

In one embodiment, the system 100 includes an illumination source 101. In one embodiment, the illumination source 101 includes a first light source 104 and a second light source 105. The first light source 104 and second light source 105 may include any light source known in the optical arts including, but not limited to, two or more lasers. For example, the first light source 104 and second light source 105 may include, but are not limited to, a first diode laser and second diode laser source. For instance, the first light source 104 and second light source 105 may include, but are not limited to, a first tunable diode laser and a second tunable diode laser (TDL). In another embodiment, the first light source 104 and the second light source 105 generate light of different wavelength. For example, the first light source 104 emits light having a first wavelength $\lambda_A$ and the second light source 105 emits light having a second wavelength $\lambda_B$.

In another embodiment, the illumination source 101 includes a combiner-splitter element 106. The combiner-splitter element 106 may include any optical element or device suitable for combining or multiplexing multiple optical signals and subsequently splitting the combined/multiplexed optical signal. In one embodiment, the combiner-splitter element 106 includes a fiber bundle combiner-splitter (FBSC). For example, the combiner-splitter element 106 may include any FBSC known in the art of optics.

In another embodiment, the illumination source 101 includes a set of optical fiber bundles, which define the optical paths 108-111. The fiber bundles serve to relay light from the first and second light sources 104 to the combiner-splitter element 106 and further relay the combined light from the combiner-splitter element 106 to the first and second channels of the optical sub-system 101.

In one embodiment, the first light source 104 emits light of a first wavelength $\lambda_A$ along a first input path 108 and the second light source 105 emits light of a second wavelength $\lambda_B$ along a second input path 109. In another embodiment, the combiner-splitter element 106 combines the light of the first wavelength $\lambda_A$ from the first input path 108 and the light of the second wavelength $\lambda_B$ from the second input path 109. Then, the combiner-splitter element 106 splits the combined light along a first output path 110 to a first channel (Channel 1) of the optical sub-system 102 and a second channel (Channel 2) of the optical sub-system 102. In this regard, the combiner-splitter element 106 mixes light from the first light source 104 and light from the second light source 105 across both Channel 1 and Channel 2 of the optical sub-system 101. For example, combiner-splitter element 106 may transmit light of the first wavelength $\lambda_A$ from the first input path 108 and light of the second wavelength $\lambda_B$ from the second input path 109 along the first output path 110 to Channel 1 of the optical sub-system 102. Further, the combiner-splitter element 106 may also transmit light of the first wavelength $\lambda_A$ from the first input path 108 and light of the second wavelength $\lambda_B$ from the second input path 109 along the second output path 111 to Channel 2 of the optical sub-system 102.

In this regard, Channel 1 and Channel 2 both receive light of the first wavelength $\lambda_A$ and the second wavelength $\lambda_B$. In another embodiment, combiner-splitter element 106 may combine and split the light from the first and second light sources 104, 105 so as to control the relative amount of light of the first wavelength $\lambda_A$ and the second wavelength $\lambda_B$ in Channel 1 and Channel 2. For example, the combiner-splitter element 106 may control the transmission of light so as to control the content of $\lambda_A$ light and $\lambda_B$ light received by Channel 1 and Channel 2.

The optical sub-system 102 of system 100 may include any optical sub-system, system or tool known in the art requiring multiple channels with different wavelengths of light and/or other optical characteristics. In one embodiment, the optical sub-system 102 of system 100 includes a dual wavelength dual interferometer system.

FIG. 1B illustrates system 100 in the case where the optical sub-system is a dual wavelength dual interferometer, in accordance with one or more embodiments of the present disclosure. It is noted herein that the explanation examples and embodiments described previously herein should be interpreted to extend to FIG. 1B unless otherwise noted.

In one embodiment, the optical sub-system 101 is a dual wavelength Fizeau dual (DWFDI) interferometer. The system 100 may be configured to measure one or more spatial characteristics of a sample, such as shape variation, thickness variation, and/or other spatial parameter variations of the sample. In another embodiment, the DWFDU system may be adapted to perform patterned wafer geometry (PWG) measurements on a sample, whereby the dynamic range of the sample slope (e.g., wafer slope) measured by the interferometer system 100 is extended by stitching different regions of the sample (e.g., wafer) measurement results together. Further, each region may be collimated by tilting the given sample within the cavity of the system 100.

A description of a dual wavelength dual interferometer is described in U.S. Pat. No. 6,847,458, issued on Jan. 25, 2005, which is incorporated herein by reference in the entirety. A description of a dual wavelength dual interferometer is described in U.S. Pat. No. 8,068,234, issued on Nov. 29, 2011, which is incorporated herein by reference in the entirety. A description of a dual wavelength dual interferometer is described in U.S. Patent Publication No. 2014/0293291, published on Oct. 2, 2014, which is incorporated herein by reference in the entirety. A description of a dual wavelength dual interferometer used to measure shape and thickness of high slope samples is described in U.S. Pat. No. 7,847,954, issued on Dec. 7, 2010, which is incorporated herein by reference in the entirety. It is note that the present disclosure is not limited to the optical configuration depicted in FIG. 1B, which is provided merely for illustration. It is recognized herein that the present disclosure may be extended to any phase-shifting interferometry system configured to utilize a wavelength-tunable illumination source for phase shifting. Accordingly, the following description of system 100 is not intended to limit the present disclosure in any way.

In one embodiment, the optical sub-system 102 of system 100 includes two interferometers 150 and 151. In one embodiment, the DWFDI system 100 includes illumination source 101, as described throughout the present disclosure, which is further configured to provide light along Channel 1 and Channel 2 to the interferometers 150 and 151. In this regard, the DWFDI system 100 is configured to utilize the combined light signal from the combiner-splitter 101 of illumination source 101 for phase shifting measurements.

In one embodiment, the optical Channels 1 and 2 of the system 100 include optical fibers 128 and 129 configured to transmit the combined light from the output paths 110 and 111 of the illumination source 101 to the interferometer inputs 152 and 153. In one embodiment, the interferometer inputs 152 and 153 include one or more optical elements connected in series with the one or more optical fibers 128 and 129. In another embodiment, the interferometer inputs 152 and 153 may include the optical fibers 128 and 129. The interferometer inputs 152 and 153 may direct at least a portion of the combined light from the output paths 110, 111 of the illumination source 101 to the phase-shifting interferometers 150 and 152.

In one embodiment, the interferometers 150 and 151 each include one or more polarizing beam splitters 112, 113 configured to receive light from the interferometer inputs 152, 153. In another embodiment, the beam splitters 112, 113 direct a portion of the light to quarter-wave plates 154, 155 (e.g., aligned at 45 degrees to the polarization direction of the polarizing beam splitters 112, 113). Light passing through the polarizing beam splitters 112,113 and through the quarter-wave plates 154 and 155 may be circularly polarized. The circularly polarized light may then be received by lenses 114, 115 configured to collimate the light into beams having a diameter greater than a diameter of the sample 118. The one or more lenses 114, 115 may also direct the collimated beams to reference flats 116,117 (e.g., parallel reference flats). The sample 118 may be positioned in the center of the cavity 119 defined by the reference flats 116, 117. In another embodiment, the collimated beams may be transmitted through the reference flats 116, 117 to sample 118.

In another embodiment, a first portion of each of the transmitted beams is directed to one or more surfaces 120, 121 of the sample 118. Further, a second a portion of each of the transmitted beams is directed to the reference surfaces of the reference flats 116, 117 located opposite to the one or more transmitting reference flats 117, 116. For example, the first portion of a transmitted beam from reference flat 116 may be directed to test surface 120 of the sample 118, while the second portion of the transmitted beam from reference flat 116 is directed to the reference surface of reference flat 116. Similarly, the first portion of a transmitted beam from reference flat 117 may be directed to surface 121 of the sample 118, the second portion of the transmitted beam from reference flat 117 is directed to the reference surface of reference flat 116.

In another embodiment, the system 100 includes detectors 122, 123. The detectors 122, 123 may include, but are not limited to, one or more CCD detectors, one or more TDI-CCD detectors, one or more CMOS detectors, or any other photodetectors known in the art. In one embodiment, the detectors 122, 123 may be configured to detect portions of illumination reflected from the one or more surfaces 120, 121 of the sample 118. In another embodiment, the detectors 122, 123 are configured to detect portions of light reflected from corresponding reference surfaces of reference flats 116, 117. In another embodiment, the system 100 includes one or more controllers 126,127 communicatively coupled to the detectors 122, 123. In another embodiment, the one or more controllers 126, 127 acquire information associated with detected light from the detectors 122, 123. In another embodiment, the controllers 126, 127 may execute a measurement algorithm from program instructions stored on memory to determine one or more spatial characteristics of the sample 118 based on measurements from the sample 118. Measurement algorithms for determining spatial characteristics of samples with phase-shifting interferometry systems are known to the art. It is noted that any measurement process known in the art may be implemented with system 100 and the one or more controllers 126, 127.

While the present disclosure describes system 100 in the context of a dual wavelength dual interferometer system, this implementation should not be interpreted as a limitation on the scope of the present disclosure and is provided merely for illustrative purposes. For instance, the illumination source 101 of the present disclosure may be implemented in the context of any optical setting requiring multiple light channels, including, but not limited to, multiple channel inspection, metrology and the like. The remainder of the present disclosure describes various embodiments related to the combiner-splitter element 106, which are applicable to any optical sub-system requiring multiple wavelength multiple channel capabilities.

FIG. 1C illustrates a combiner-splitter element 106 of an illumination source for combining light from two lasers, in accordance with one or more embodiments of the present disclosure. In one embodiment, the first input optical fiber bundle 108 transmits light of a first wavelength $\lambda_A$ to the combiner-splitter element 106 and the second input optical fiber bundle 109 transmits light of a second wavelength $\lambda_B$ to the combiner-splitter element 106. In another embodiment, the combiner-splitter element 106 combines (or multiplexes) the light of the first wavelength $\lambda_A$ and the light of the second wavelength $\lambda_B$. Then, the combiner-splitter element 106 splits the light along a first output optical fiber bundle 110 and a second output optical fiber bundle 111. In this regard, combiner-splitter element 106 splits the combined light such that the first output optical fiber bundle 110 receives both light of the first wavelength $\lambda_A$ and the light of the second wavelength $\lambda_B$. In addition, the second output optical fiber bundle 111 also receives both light of the first wavelength $\lambda_A$ and the light of the second wavelength $\lambda_B$. In another embodiment, the first and second output optical fibers 110, 111 are coupled to a selected optical sub-system (e.g., DWFDI sub-system) to provide two beams, whereby each beam contains light of the first wavelength $\lambda_A$ and the light of the second wavelength $\lambda_B$.

In another embodiment, combiner-splitter element 106 splits the combined light such that the first and second output optical fiber bundle 110, 111 receive light of the first wavelength $\lambda_A$ and the light of the second wavelength $\lambda_B$ in a selected proportion. For example, the combiner-splitter element 106 may split the combined light so that a first fraction of the individual fibers of the first output fiber bundle 110 carries light of the first wavelength $\lambda_A$ with the remaining individual fibers of the first output fiber bundle carrying light the second wavelength $\lambda_B$. Further, the combiner-splitter element 106 may also direct the combined light so that a first fraction of the individual fibers of the second output fiber bundle 110 carries light of the second wavelength $\lambda_B$ with the remaining individual fibers of the second output fiber bundle carrying light the first wavelength $\lambda_A$.

For example, the combiner-splitter element 106 may split the combined light so that 50% of the fibers of the first output optical fiber bundle 110 and 50% of the fibers of the second fiber optical fiber bundle 111 carry light of the first wavelength $\lambda_A$ and 50% of the fibers of the first optical fiber bundle 110 and 50% of the fibers of the second fiber optical fiber bundle 111 carry light of the second wavelength $\lambda_B$. It is noted herein that the present disclosure is not limited to an even splitting of light components, which is provided here merely for illustration. Rather, it is recognized that the combiner-splitter element 106 may be provide any combination of light components.

For example, the combiner-splitter element 106 may split the combined light so that 60% of the fibers of the first output optical fiber bundle 110 carry light of the first wavelength $\lambda_A$ and 40% of the fibers of the first optical fiber bundle 110 carry light of the second wavelength $\lambda_B$, while 40% of the fibers of the second output optical fiber bundle 111 carry light of the first wavelength $\lambda_A$ and 60% of the fibers of the second optical fiber bundle 111 carry light of the second wavelength $\lambda_B$ By way of another example, the combiner-splitter element 106 may split the combined light so that 75% of the fibers of the first output optical fiber bundle 110 carry light of the first wavelength $\lambda_A$ and 25% of the fibers of the first optical fiber bundle 110 carry light of the second wavelength $\lambda_B$, while 25% of the fibers of the second output optical fiber bundle 111 carry light of the first wavelength $\lambda_A$ and 75% of the fibers of the second optical fiber bundle 111 carry light of the second wavelength $\lambda_B$ More generally, in one embodiment, in the case of a two-wavelength implementation, the combiner-splitter element 106 may split the combined light so that N % of the fibers of the first output optical fiber bundle 110 carry light of the first wavelength $\lambda_A$ and M % of the fibers of the first optical fiber bundle 110 carry light of the second wavelength $\lambda_B$, while M % of the fibers of the second output optical fiber bundle 111 carry light of the first wavelength $\lambda_A$ and N % of the fibers of the second optical fiber bundle 111 carry light of the second wavelength $\lambda_B$, where N and M are between 0 and 100.

In another embodiment, the optical fibers of the first and second optical fiber bundles 110, 111 are positioned such that end portions of the output fibers are distributed randomly. It is noted herein that the distribution of the optical fibers of the optical bundles 110, 111 aids in achieving a uniform light distribution at the output of the output fibers 110, 111.

Referring again to FIG. 1B, it is noted that the light sources 104 and 105 may be selected to generate light of any selected wavelength or wavelength range. For example, the light sources 104, 105 may each include one or more laser sources capable of emitting light in the ultraviolet, visible or near infrared spectral regions. For instance, the first light source 104 may include, but is not limited to, a TDL that emits light at a wavelength of 635 or 639 nm. It is noted herein that these wavelength values correspond with commonly used wavelength values for carrying out wafer shape and PWG measurements. It is noted herein that the choice of the second wavelength $\lambda_B$ may depend on a number of factors including, but not limited to, the spectral response range of a corresponding detector (e.g., detectors 122, 123), the optical elements present in the corresponding optical sub-system, the presence of optical coatings and the like. For instance, the second light source 105 may include, but is not limited to, a TDL that emits light at a wavelength in the near infrared spectrum (e.g., 850 nm).

In one embodiment, the two or more light sources 104, 105 are controlled (e.g., controller via controller) to generate/emit light at different times. In another embodiment, the two or more light sources 104, 105 are controlled (e.g., controller via controller) to generate/emit light simultaneously. In another embodiment, in the case where the light sources 104, 105 operate simultaneously, the output of the two light sources 104, 105 are separated via one or more filters and/or one or more algorithms. In the case of wafer geometry measurements, in some embodiments, only a single light source is needed to acquire adequate measurements from normal/low slope wafers, filmless wafers and unpatterned wafers. In cases where wafer geometry measurements require a second wavelength to enhance measurement capabilities, such as for wafers with high slope, wafers with films and patterned wafers, two lasers may be used, either simultaneously or separately. In this regard, data from the separate or simultaneous operation of light sources 104, 105 may be used to calculate wafer geometry information.

In another embodiment, the light transmitted from the output fiber bundles 110, 111 are processed by one or more optical elements. For example, the system 100 may include one or more rotating ground glass elements and/or beam homogenizers (not shown). In this regard, light from the output fiber bundles 110, 111 may be transmitted through the rotating ground glass element prior to entering Channel 1 and Channel 2 of the DWDFI sub-system.

FIG. 1D illustrates the individual fibers of the optical fiber bundles 108, 109, 110, 111 of the combiner-splitter element of an illumination source for combining light from two lasers, in accordance with one or more embodiments of the present disclosure. The optical fiber bundles 108-111 may contain any number of optical fibers. For example, each of the optical fiber bundles may include, but is not limited to, 10-1000 fibers. For instance, FIG. 1D depicts the case where each optical fiber bundle 108-111 contains 37 optical fibers.

By way of another example, in the case of two-wavelength combination where each optical bundle 108-111 contains 100 optical fibers, all 100 optical fibers of the first input optical bundle 108 carry light of the first wavelength $\lambda_A$, with all 100 optical fibers of the second input optical bundle 109 carrying light of the second wavelength $\lambda_B$. Further, a first selected number of the optical fibers of the first input optical bundle 108 are routed to the first output optical bundle 110, while a second selected number of the optical fibers of the first input optical bundle 108 are routed to the second output optical bundle 111. Similarly, a first selected number of the optical fibers of the second input optical bundle 109 are routed to the first output optical bundle 110, while a second selected number of the optical fibers of the second input optical bundle 109 are routed to the second output optical bundle 111. FIG. 1D depicts the case where 50% of the optical fibers of the first and second output optical bundles 110, 111 carry light of the first wavelength $\lambda_A$ and the other 50% of the optical fibers carry light of the second wavelength $\lambda_B$. It is noted that this configuration is not a limitation on the present disclosure and is provided merely for purposes of illustration.

FIG. 1E illustrates a combiner-splitter element of an illumination source for combining light from three or more lasers, in accordance with one or more embodiments of the present disclosure, in accordance with one or more embodiments of the present disclosure. While much of the present disclosure has focused on the implementation of system 100 in the context of two laser sources (e.g., 104 and 105), the system 100 of the present disclosure is not limited to two laser sources. It is recognized herein that the system 100, the illumination source 101 and the combiner-splitter element 106 may be extended to operate in the context of any number of laser or light sources.

In one embodiment, as shown in FIG. 1E, the illumination source 101 includes three laser sources 104, 105 and 140. In another embodiment, each of the optical fiber bundlers 108, 109 and 140 transmit light from each of the respective laser sources 104, 105 and 140 to the combiner-splitter element 106. For example, the first input optical fiber bundle 108 transmits light of a first wavelength $\lambda_A$ to the combiner-splitter element 106, the second input optical fiber bundle 109 transmits light of a second wavelength $\lambda_B$ to the combiner-splitter element 106, and the third input optical fiber bundle 142 transmits light of a third wavelength $\lambda_C$ to the combiner-splitter element 106. It is noted that this configuration may be extended to any number of lights sources and input optical fiber bundles up to and including N number of light sources input optical fiber bundles.

In another embodiment, the combiner-splitter element 106 combines (or multiplexes) the light of the first wavelength $\lambda_A$, the light of the second wavelength $\lambda_B$, and the light of the light of the third wavelength $\lambda_C$.

In another embodiment, the combiner-splitter element 106 splits the combined light along a first output optical fiber bundle 110, a second output optical fiber bundle 111, and a third output optical fiber bundle 143. For example, combiner-splitter element 106 may split the combined light such that the first output optical fiber bundle 110 receives light of the first wavelength $\lambda_A$, light of the second wavelength $\lambda_B$ and light of the third wavelength $\lambda_C$. Further, the second output optical fiber bundle 111 and the third output optical fiber bundle 143 also receive light of the first wavelength $\lambda_A$, light of the second wavelength $\lambda_B$ and light of the third wavelength $\lambda_C$.

In another embodiment, the first, second and third output optical fibers 110, 111, 143 are coupled (not shown) to selected multiple channels (e.g., three channels) of an optical sub-system (e.g., DWFDI sub-system, inspection system, metrology system and the like) to provide three beams to the optical sub-system, whereby each beam contains light of the first wavelength $\lambda_A$, light of the second wavelength $\lambda_B$ and light of the third wavelength $\lambda_C$. It is noted that this configuration may be extended to an optical sub-system with any number of input optical channels, up to and including N number of optical channels.

As previously noted herein, In another embodiment, combiner-splitter element 106 splits the combined light such that the first, second and third output optical fiber bundles 110, 111, 143 receive light of the first wavelength $\lambda_A$, the light of the second wavelength $\lambda_B$ and the light of the second wavelength $\lambda_C$ in a selected proportion.

For example, the combiner-splitter element 106 may split the combined light so that a first fraction of the individual fibers of the first output fiber bundle 110 carries light of the first wavelength $\lambda_A$, a second fraction of the individual fibers of the first output fiber bundle 110 carries light of the second wavelength $\lambda_B$ and a third fraction of the individual fibers of the first output fiber bundle 110 carries light of the third wavelength $\lambda_C$. Further, the combiner-splitter element 106 may split the combined light so that a first fraction of the individual fibers of the second output fiber bundle 111 carries light of the first wavelength $\lambda_A$, a second fraction of the individual fibers of the second output fiber bundle 111 carries light of the second wavelength $\lambda_B$ and a third fraction of the individual fibers of the second output fiber bundle 111 carries light of the third wavelength $\lambda_C$. Further, The combiner-splitter element 106 may split the combined light so that a first fraction of the individual fibers of the third output fiber bundle 143 carries light of the first wavelength $\lambda_A$, a second fraction of the individual fibers of the third output fiber bundle 143 carries light of the second wavelength $\lambda_B$ and a third fraction of the individual fibers of the third output fiber bundle 143 carries light of the third wavelength $\lambda_C$. It is again noted that this configuration may be extended to any number of laser sources, input and output optical fiber bundles and any proportion of wavelength components, as discussed throughout the present disclosure.

FIGS. 1F-1G illustrate an illumination source and a combiner-splitter element configured for adjusting intensity along a selected optical path by controlling the distance between two optical fiber ends in accordance with one or more embodiments of the present disclosure.

In another embodiment, the intensity of light traveling along the various input fiber bundles 108, 109 and/or the output fiber bundles 110, 111 is controlled. In one embodiment, the intensity of light traveling along the one or more fiber bundles 108-111 is controlled by including a "gap" along one or more of the fiber bundles 108-111. The size of the gap may then be controlled (e.g., controlled via an actuation device coupled to a controller (not shown)). By controlling the size of gap between fiber ends, the intensity of light transmitted across the gap and down the given fiber bundle is, in turn, controlled. For example, as shown in FIGS. 1E and 1F, the distances d1-d4 between fiber sections are controlled to control the intensity of light transmitted to the fiber sections downstream of the given gaps between fibers. For instance, in the case of the first input optical fiber bundle 108, as shown in FIG. 1F, the distance d1 between a first fiber section 130 and a section fiber section 132 may be controlled in order to control the intensity of light transmitted from the first fiber section 130 to the second fiber section 132. In this regard, the intensity of light transmitted to the downstream fiber sections is inversely proportion to the size of the given gap. It is noted that this intensity control mechanism may be applied to any of the input and output fiber bundle sections described throughout the present disclosure.

In one embodiment, light transmitted along the input and/or output fiber bundles 108-111 may have different physical properties. In addition, to having different wavelength properties, as discussed throughout the present disclosure, the light may also have a number of different physical properties. For example, light transmitted along the input and/or output fiber bundles may have different intensities, different polarizations, different modulation characteristics and the like. For example, light transmitted by the first input optical fiber bundle 108 may have one or more first physical properties, while light transmitted by the second input optical fiber bundle 109 have one or more second physical properties different from the first physical properties. For instance, light transmitted by the first input optical fiber bundle 108 may have a first intensity, while light transmitted by the second input optical fiber bundle 109 have a second intensity different from the first intensity. In another instance, light transmitted by the first input optical fiber bundle 108 may have a first polarization, while light transmitted by the second input optical fiber bundle 109 have a second polarization different from the first polarization. In another instance, light transmitted by the first input optical fiber bundle 108 may have a first modulation frequency, while light transmitted by the second input optical fiber bundle 109 have a second modulation frequency different from the first modulation frequency. It is noted that this difference in the physical properties of transmitted light may be extended to any of the optical fiber bundles described throughout the present disclosure.

FIG. 2 illustrates a flow diagram depicting a process for providing light combined from two or more lasers of an illumination source to two or more channels of an optical sub-system, in accordance with one or more embodiments of the present disclosure. It is noted herein that, while the methods described throughout the remainder of the present disclosure are described in light of the system 100, described previously herein, the following methods are not limited to the structural and optical configurations of system 100. Rather, it is recognized herein that process 200 may extend to additional structural and optical configurations.

In step 202, light of a first wavelength $\lambda_A$ is generated and directed along a first input path 108. In step 204, light of a second wavelength $\lambda_B$ is generated and directed along a second input path 109. In step 206, the light of the first wavelength $\lambda_A$ and the light of the second wavelength $\lambda_B$ is combined (e.g., combined with combiner-splitter element 106). In step 209, the combined light is split along a first channel (Channel 1) and a second channel (Channel 2) of an optical sub-system such both the first channel and the second channel receive light of the first wavelength $\lambda_A$ and second wavelength $\lambda_B$.

While implementations of method 200 are discussed herein, it is further contemplated that various steps of method 200 may be included, excluded, rearranged, and/or implemented in many ways without departing from the essence of the present invention. Accordingly, the foregoing embodiments and implementations of method 200 are included by way of example only and are not intended to limit the present disclosure in any way.

It should be recognized that the various steps described throughout the present disclosure may be carried out by a single computing system or, alternatively, a multiple computing system. Moreover, different subsystems of the system may include a computing system suitable for carrying out at least a portion of the steps described above. Therefore, the above description should not be interpreted as a limitation on the present invention but merely an illustration. Further, the one or more computing systems may be configured to perform any other step(s) of any of the method embodiments described herein.

The computing system may include, but is not limited to, a personal computing system, mainframe computing system, workstation, image computer, parallel processor, or any other device known in the art. In general, the term "computing system" may be broadly defined to encompass any device having one or more processors, which execute instructions from a memory medium.

Program instructions implementing methods such as those described herein may be transmitted over or stored on carrier medium. The carrier medium may be a transmission medium such as a wire, cable, or wireless transmission link. The carrier medium may also include a storage medium such as a read-only memory, a random access memory, a magnetic or optical disk, or a magnetic tape.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

It is further contemplated that each of the embodiments of the method described above may include any other step(s) of any other method(s) described herein. In addition, each of the embodiments of the method described above may be performed by any of the systems described herein.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

What is claimed:

1. A system comprising:
    a dual interferometer sub-system including a first channel and at least a second channel; and
    an illumination source comprising:
        a first laser source disposed along a first input path and configured to generate light of a first wavelength;
        at least a second laser source disposed along at least a second input path and configured to generate light of at least a second wavelength; and
        a combiner-splitter element, the combiner-splitter element optically coupled to an output of the first laser source and an output of the at least a second laser source,
        wherein the combiner-splitter element is configured to combine the light of the first wavelength and the light of the at least a second wavelength,
        wherein the combiner-splitter element is further configured to transmit a first portion of the light of the first wavelength from the first input path and a first portion of the light of the at least a second wavelength from the at least a second input path to the first channel of the dual interferometer sub-system,
        wherein the combiner-splitter element is further configure to transmit at least a second portion of the light of the first wavelength from the first input path and at least a second portion of the light of the at least a second wavelength from the at least a second input path to the at least a second channel of the dual interferometer sub-system.

2. The system of claim 1, wherein the dual interferometer sub-system comprises:
    a dual wavelength dual Fizeau interferometer (DWDFI) sub-system.

3. The system of claim 1, wherein the combiner-splitter element comprises:
    a fiber bundle combiner-splitter (FBCS).

4. The system of claim 1, wherein the first input path of the illumination source includes a first plurality of optical fibers for transmitting light from the first laser source to the combiner-splitter element.

5. The system of claim 1, wherein the at least a second input path of the illumination source includes at least a second plurality of optical fibers for transmitting light from the at least a second laser source to the combiner-splitter element.

6. The system of claim 1, wherein a first output path of the illumination source includes a first plurality of optical fibers for transmitting light from the combiner-splitter element to the first channel of the dual interferometer sub-system.

7. The system of claim 1, wherein at least a second output path of the illumination source includes at least a second plurality of optical fibers for transmitting light from the combiner-splitter element to the at least a second channel of the dual interferometer sub-system.

8. The system of claim 1, wherein a first output path transmits light at a first intensity level and at least a second output path transmits light at a second intensity level different than the first intensity level.

9. The system of claim 1, wherein the first input path is defined by a first input optical fiber bundle, wherein the second input path is defined by a second input optical fiber bundle, wherein a first output path is defined by a first output optical fiber bundle, wherein a second output path is defined by a second output optical fiber bundle.

10. The system of claim 9, wherein at least one of the first input optical fiber bundle, the second input optical fiber bundle, the first output optical fiber bundle or the second output optical fiber bundle includes a plurality of optical fibers.

11. The system of claim 10, wherein the plurality of optical fibers includes between 10 and 1000 optical fibers.

12. The system of claim 9, wherein the optical fibers of the first output optical fiber bundle of the first output path and the optical fibers of the second output optical fiber bundle of the at least a second output path are randomly distributed.

13. The system of claim 1, wherein at least one of the first laser source or the second laser source is a diode laser.

14. The system of claim 13, wherein at least one of the first laser source or the second laser source is a tunable diode laser.

15. The system of claim 1, wherein first laser source generates light including at least one of ultraviolet light, visible light or near infrared light.

16. The system of claim 1, wherein the at least a second laser source generates light including at least one of ultraviolet light, visible light or near infrared light.

17. The system of claim 1, wherein the first laser source and the at least a second laser source emit light simultaneously.

18. The system of claim 1, wherein the first laser source and the at least a second laser source emit light at different times.

19. The system of claim 1, wherein the intensity of light transmitted along the first input path is different from the intensity of light transmitted along the at least a second input path.

20. The system of claim 1, wherein the intensity of light transmitted to the first channel of the dual interferometer sub-system is different from the intensity of light transmitted to the at least a second channel of the dual interferometer sub-system.

21. A system comprising:
    an optical sub-system including a first channel and at least a second channel; and
    an illumination source comprising:
        a first laser source disposed along a first input path and configured to generate light of a first wavelength;
        at least a second laser source disposed along at least a second input path and configured to generate light of at least a second wavelength; and
        a combiner-splitter element, the combiner-splitter element optically coupled to an output of the first laser source and an output of the at least a second laser source,
        wherein the combiner-splitter element is configured to combine the light of the first wavelength and the light of the at least a second wavelength,
        wherein the combiner-splitter element is further configured to split the combined light along a first output path to the first channel of the optical sub-system and at least a second output path to at least the second channel of the optical sub-system.

22. The system of claim 21, wherein the combiner-splitter element comprises:
a fiber bundle combiner-splitter (FBCS).

23. The system of claim 21, wherein the optical fibers of the first output path and the optical fibers of the at least a second output path are randomly distributed.

24. The system of claim 21, wherein at least one of the first laser source or the second laser source is a diode laser.

25. The system of claim 24, wherein at least one of the first laser source or the second laser source is a tunable diode laser.

26. The system of claim 21, wherein the first input path is defined by a first input optical fiber bundle, wherein the second input path is defined by a second input optical fiber bundle, wherein the first output path is defined by a first output optical fiber bundle, wherein the second output path is defined by a second output optical fiber bundle.

27. The system of claim 26, wherein at least one of the first input optical fiber bundle, the second input optical fiber bundle, the first output optical fiber bundle or the second output optical fiber bundle includes a plurality of optical fibers.

28. The system of claim 27, wherein the plurality of optical fibers includes between 10 and 1000 optical fibers.

29. The system of claim 21, wherein first laser source generates light including at least one of ultraviolet light, visible light or near infrared light.

30. The system of claim 21, wherein the at least a second laser source generates light including at least one of ultraviolet light, visible light or near infrared light.

31. The system of claim 21, wherein the first laser source and the at least a second laser source emit light simultaneously.

32. The system of claim 21, wherein the first laser source and the at least a second laser source emit light at different times.

33. The system of claim 21, wherein the intensity of light from the first light source is different from the intensity of light from the at least a second light source.

34. The system of claim 21, wherein the intensity of light transmitted to the first channel of the optical sub-system is different from the intensity of light transmitted to the at least a second channel of the optical sub-system.

35. A method comprising:
generating light of a first wavelength along a first input path;
generating light of at least a second wavelength along at least a second input path;
combining the light of the first wavelength from the first input path and the light of the at least a second wavelength from the at least a second input path; and
splitting the combined light into a first channel of an optical system and at least a second channel of the optical system, wherein the first channel and the at least a second channel receive a portion of the light of the first wavelength from the first input path and a portion of the light of the at least a second wavelength from the at least a second input path.

* * * * *